US011639297B1

(12) United States Patent
Alnaimat et al.

(10) Patent No.: US 11,639,297 B1
(45) Date of Patent: May 2, 2023

(54) DIRECT SOLAR DESALINATION SYSTEM WITH ENHANCED DESALINATION

(71) Applicant: UNITED ARAB EMIRATES UNIVERSITY, Al Ain (AE)

(72) Inventors: Fadi Alnaimat, Al Ain (AE); Mohammed Ziauddin, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/964,594

(22) Filed: Oct. 12, 2022

(51) Int. Cl.
  *C02F 1/26* (2023.01)
  *C02F 103/08* (2006.01)

(52) U.S. Cl.
  CPC .......... *C02F 1/265* (2013.01); *C02F 2103/08* (2013.01); *C02F 2201/002* (2013.01); *C02F 2201/009* (2013.01)

(58) Field of Classification Search
  CPC .. Y02A 20/142; Y02A 20/124; Y02A 20/212; C02F 1/26; C02F 1/32; C02F 1/36; C02F 1/48
  See application file for complete search history.

(56) References Cited

U.S. PATENT DOCUMENTS

| 3,775,257 A | 11/1973 | Lovrich |
| 4,487,659 A * | 12/1984 | Stark ........................ C02F 1/14 202/202 |
| 4,495,034 A | 1/1985 | Lucas |
| 5,316,626 A | 5/1994 | Guy |
| 2011/0139601 A1 | 6/2011 | Johnstone |

(Continued)

FOREIGN PATENT DOCUMENTS

| CN | 105413609 A | 3/2016 |
| CN | 109292868 A | 2/2019 |

(Continued)

OTHER PUBLICATIONS

Ahmed, "The Effects of Various Types and Layouts of Wick Materials on the Thermal Performance of Conventional Solar Stills," 2016 IEEE Smart Energy Grid Engineering (SEGE), Aug. 21-24, 2016, pp. 84-89.

(Continued)

*Primary Examiner* — Walter D. Griffin
*Assistant Examiner* — Cameron J Allen
(74) *Attorney, Agent, or Firm* — Nath, Goldberg & Meyer; Richard C. Litman

(57) ABSTRACT

The direct solar desalination system with enhanced desalination has a main chamber having a slanted transparent top and vertical sidewalls. Saltwater is fed to the top of a series of plates, with the top plate and every other plate slanting into the chamber, while the intervening plates slant back toward the chamber wall. The lower edge of the plates that are slanted into the chamber have a plurality of copper channels or wires extending between the plate's edge and the opposite chamber wall. Saltwater that does not flow down the channels/wires drips down to the next plate and so forth, and any remaining saltwater is collected at the bottom of the chamber. The channels/wires are coated with a photothermal layer to enhance evaporation. The fresh water condenses on the bottom surface of the slanted top, flows down the surface, and is collected at the bottom of the shortest sidewall.

14 Claims, 3 Drawing Sheets

(56) References Cited

U.S. PATENT DOCUMENTS

2011/0300661 A1 12/2011 Pearce et al.
2014/0332364 A1 11/2014 Lusk et al.
2015/0353385 A1 12/2015 Wang et al.

FOREIGN PATENT DOCUMENTS

WO    WO-2009009873 A1 * 1/2009 ........... B01D 1/0035
WO       2009089371 A1    7/2009

OTHER PUBLICATIONS

Abujazar et al., "Performance evaluation of inclined copper-stepped solar still in a wet tropical climate," Desalination, 425, 94-103, 2018.
Roshdy et al., "Experimental investigation of the performance of a single-slope solar still under Aswan climate conditions," IET Renew. Power Gener., 2021;15:3901-3914.

* cited by examiner

DIRECT SOLAR DESALINATION SYSTEM WITH ENHANCED DESALINATION

BACKGROUND

1. Field

The disclosure of the present patent application relates to solar desalination, and particularly to a direct solar desalination system with enhanced desalination.

2. Description of the Related Art

The worldwide increasing scarcity of freshwater has driven the search for methods of distilling freshwater from saltwater and wastewater sources. Many of these desalination systems use electrical power from the grid or from photovoltaic (PV) panels to power a desalination system, such as reverse osmosis (RO) desalination systems. When PV panels are used, regular cleaning of the PV panels is required to remove dust and debris that negatively affect the efficiency of the PV panels, and therefore their power output. Many of these systems use high-pressure pumps that consume high levels of electrical energy.

Solar-thermal desalination (STD) systems are showing promise as a low or zero energy method of desalination. Direct STD desalination systems are directly heated by solar rays. Some of these systems require pumps to feed saltwater to a solar chamber and/or drain freshwater from the solar chamber. In addition, these prior art STD systems are relatively inefficient and require a large solar chamber per volume of freshwater produced.

Thus, a direct solar desalination system with enhanced desalination solving the aforementioned problems is desired.

SUMMARY

The direct solar desalination system with enhanced desalination provides low cost, high quality freshwater production using direct solar energy and is capable of being operated without any electrical input from the grid or from PV panels. In addition, the system is simple and easy to fabricate, operate, and maintain without the need for high-pressure pumps or filters, such as those needed in RO systems.

The direct solar desalination system with enhanced desalination has a main chamber with a slanted transparent top and vertical sidewalls. Saltwater, wastewater or other liquid to be distilled is fed to the top of a series of plates in a zig-zag arrangement, in which the top plate and every other (alternating) plate slants into the chamber, while the intervening return plates slant back toward the chamber wall. The lower edge of the plates that are slanted into the chamber have a plurality of copper channels or wires extending between the plate's edge and the opposite chamber wall. Saltwater that does not flow down the channels/wires drips down to the next plate and so forth, and any remaining saltwater is collected at the bottom of the chamber. The channels/wires are coated with a photothermal layer to enhance evaporation. The fresh water condenses on the bottom surface of the slanted top, flows down the surface, and is collected at the bottom of the shortest sidewall.

The system operates at ambient conditions within a temperature range of 20° C. to 50° C. during the day and 15° C. to 25° C. during at night. The supplied seawater can be preheated by direct solar radiation. The temperature range of seawater entering the system is preferably between 20° C. to 30° C. The zig-zag arrangement of the plates and the channels/wires increases the temperature of the saltwater further by 10° C. to 15° C. Reflective surfaces can be attached to the top of the sidewalls for improved solar energy capture. The range of relative humidity inside the open-water/closed-air (OWCA) system will generally be above 70%.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
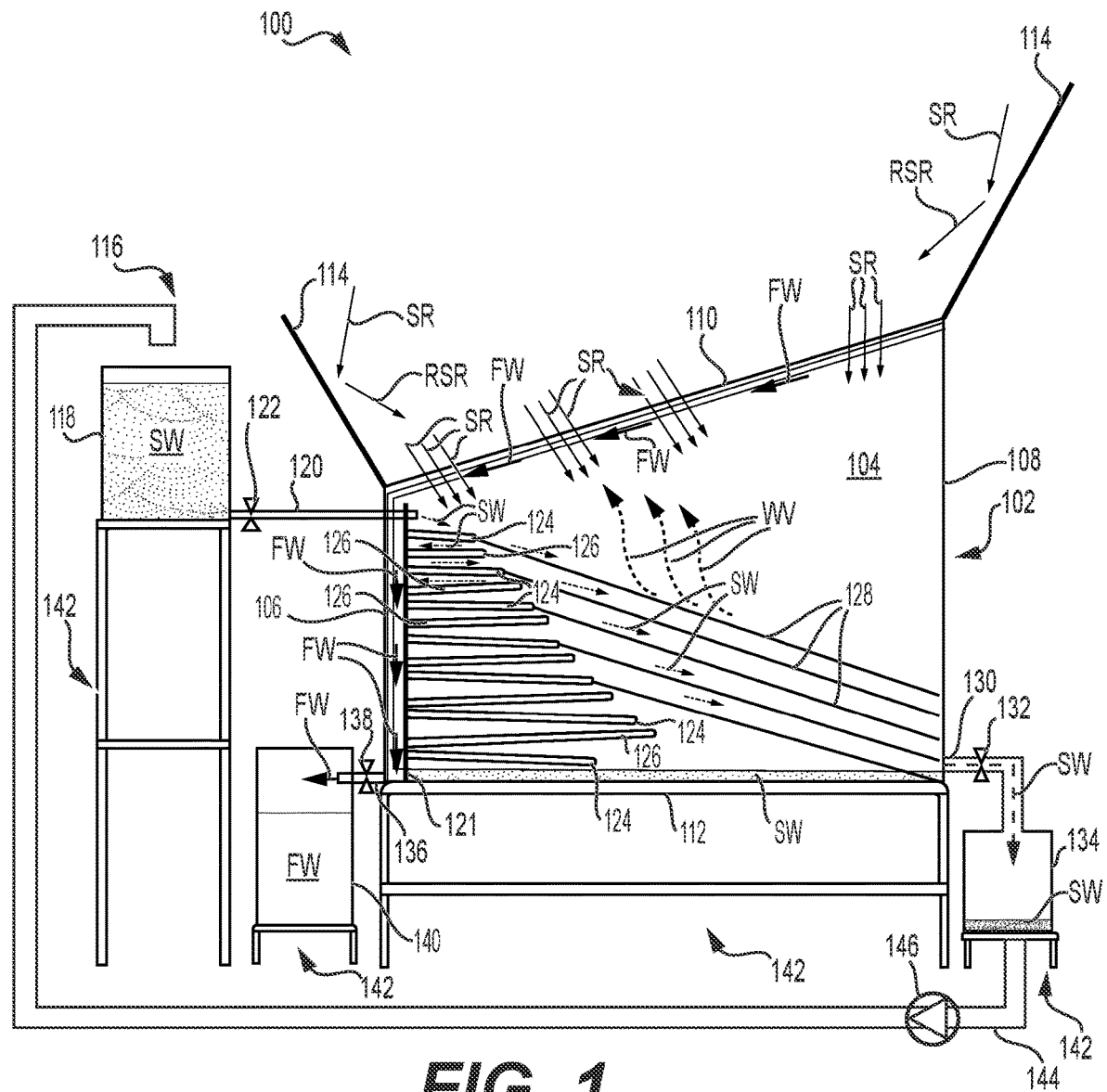
FIG. 1 is a schematic side view of a direct solar desalination system with enhanced desalination.

The direct solar desalination system with enhanced desalination 100 is shown schematically in FIG. 1 with its front wall removed (or transparent) to show its interior components. The system 100 includes a distillation chamber 102 having a front, planar trapezoidal wall (not shown); a rear, planar trapezoidal wall 104; a relatively short left planar wall 106; a relatively tall right planar wall 108; a slanted, planar, transparent top cover 110; and a bottom wall 112. The top cover 110 of the chamber 102, may optionally include reflectors 114 extending above the chamber 102 for reflecting the sun's rays SR to produce reflected sunrays RSR directed toward the distillation chamber 102. It should be understood that in addition to the top cover 110, the walls 104, 106, 108 are also preferably transparent to allow maximum solar energy to enter the distillation chamber 102, in which case the transparent, front, planar trapezoidal wall may be a mirror image of the rear wall 104 in FIG. 1.

Figure 2:
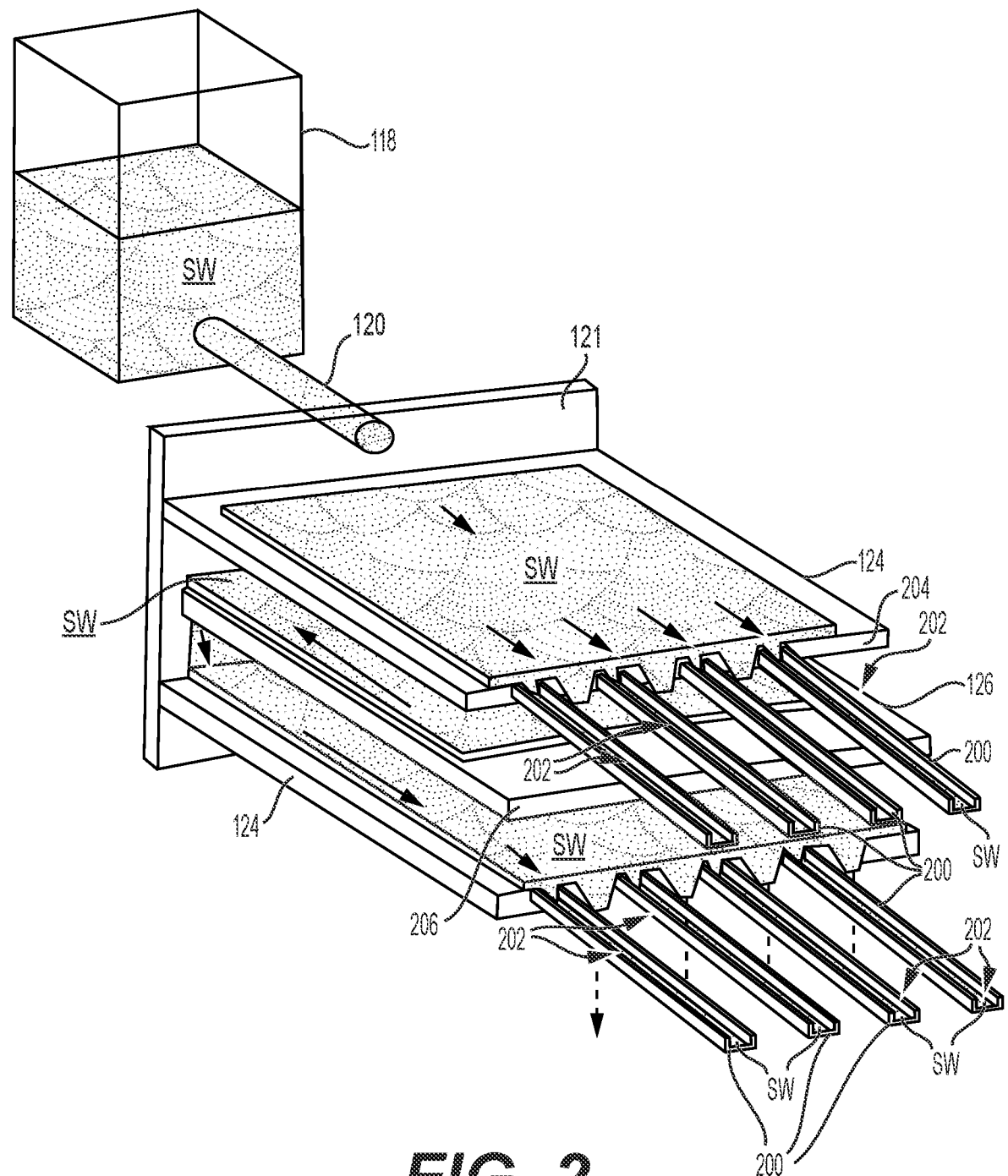
FIG. 2 is a schematic partial perspective view of a saltwater distribution system of the direct solar desalination system with enhanced desalination of FIG. 1.

Saltwater is supplied to the distillation chamber 102 from a saltwater source 116. In the embodiment shown in FIGS. 1 and 2, the saltwater source 116 is a saltwater supply tank 118 having a supply of saltwater SW stored therein. The saltwater supply tank 118 may be transparent, as shown, to allow preheating of the saltwater SW by direct solar radiation. A saltwater supply pipe 120 extends through the left wall 106 and a saltwater/fresh water divider wall 121 to supply saltwater SW to the saltwater side of the salt/freshwater divider wall 121. A saltwater supply valve 122, may be installed in the saltwater supply pipe 120 to control the amount and/or flow rate of the saltwater entering the distillation chamber 102. The saltwater/fresh water divider wall 121 is adjacent to the left wall 106 and extends horizontally from the front wall to the rear wall 104, and vertically from the bottom wall 112 to a point just below the top cover 110. The saltwater/fresh water divider wall 121, the left wall 106, the front wall, the rear wall 104, and the bottom wall 112 form a freshwater basin, while the salt/fresh-water divider wall 121, the right wall 108, the front wall, the rear wall 104, and the bottom wall 112 collect excess saltwater, which drains to a saltwater basin 134. It should be understood that while the saltwater source 116 shown in FIGS. 1 and 2 is a saltwater supply tank 118, other saltwater sources, such as seawater from bodies of water, may be used. The source 116 may be industrial in nature, such as wastewater from industrial processes, or other wastewater suitable for distillation. The source 116 may provide other liquids suitable for distillation of distillates other than water.

A first desalination enhancement feature of the direct solar desalination system 100 is a series of pairs of progressively longer distillation plates defining a path for flow of saltwater in the distillation chamber 102, each pair including a top plate 124 and every other (alternating) plate 124 slanting downward into the middle of the chamber 102, while the intervening return plates 126 slant toward the divider wall and downward from the middle of the chamber 102 back toward the divider wall 121. Saltwater SW flows inwardly over the top plate 124 and downward over the distal edge of the top plate 124 and every other alternating plate 124 and onto the distal end of the intervening return plates 126 just below the corresponding inwardly slanting plate 124, the plates 124 and 126 being progressively longer from top to bottom. The saltwater flows on the slanting intervening return plates 126 and overflows at the divider wall 121 over the proximal edges of the intervening return plates 126 and onto the proximal end of the next succeeding top plate 124. This flow pattern continues downwardly on the distillation plates 124, 126, until the lowest (unpaired) top plate 124, where the excess saltwater SW that hasn't evaporated collects in the bottom of the chamber 102 and drains into the saltwater basin 134. The top plates 124 are attached to and supported by the salt/fresh-water divider wall 121, the front, planar trapezoidal wall and the rear, planar trapezoidal wall 104, while the return plates 126 are spaced from the salt/fresh-water divider wall 121 to allow saltwater to flow off their inner edge to the next succeeding top plate 124 below, and are attached to and supported by the front, planar trapezoidal wall and the rear, planar trapezoidal wall 104. The number of distillation plates 124, 126, their size and slope can be adjusted for maximum evaporation through experimentation and is not limited to any specific combination. In one embodiment, the slope of the distillation plates 124, 126 is +/−30°. The saltwater SW flow is described in greater detail below with respect to the saltwater distribution system shown in FIG. 2.

A second desalination enhancement feature of the direct solar desalination system 100 is a series of elongated members 128, which may be wires 128 as shown in FIG. 1 or channels 200, as shown in FIG. 2, made from copper or other heat-absorbing metal to further heat and evaporate the saltwater. The wires/channels 128, 200 are attached to the distal ends of the upper inwardly slanting plates 124 and extend across the distillation chamber 102 to the right wall 108. The wires 128 may be circular in cross-section or may have other cross-sectional shapes. The channels 200 have a U-shaped cross section with an upper groove 202 for the saltwater SW to flow or trickle down. The wires/channels 128, 300 may be made of copper and may be further coated with a photothermal material to form a photothermal layer on the wires/channels 128, 300 for enhanced evaporation. The number of upper inwardly slanting plates 124 with wires/channels 128, 200 and the number of wires/channels 128, 200 per plate 124 can be adjusted for maximum evaporation through experimentation and is not limited to any specific combination.

Referring to FIGS. 1 and 2, in operation saltwater SW from the saltwater supply tank 118 is fed to the initial top plate 124 and flows downward and inward (with respect to the distillation chamber 102) toward the distal end 204 of the top plate 124 in the left half or middle of the chamber 102. Upon reaching the distal end 204, some of the saltwater SW flows onto the wires 128 (FIG. 1), or into the upper grooves 202 of the channels 200, while the remainder of the saltwater SW between the channels/wires 128, 200 flows over the distal end 204 and onto the uppermost return plate 126, near its distal end 206. The saltwater SW flows down the wires/channels 128, 200 and the water evaporates from the saltwater SW, forming water vapor WV that condenses on the top wall 110, while the remainder of the saltwater SW flows down the right planar wall 108 to the bottom of the chamber 102. The saltwater SW flow continues down the remainder of the plates 124, 126 and the wires/channels 128, 200, and any unevaporated saltwater SW enters the saltwater basin 134. The excess saltwater SW is drained to the basin 134 via a saltwater drainpipe 130 that directs the excess saltwater SW into the excess saltwater basin 134. An excess saltwater valve 132 in the saltwater drainpipe 130 can be used to control the flow of the excess saltwater SW exiting the chamber 102. A saltwater return pipe 144 and a saltwater return pump 146 may be provided to return the excess saltwater SW in the excess saltwater basin 134 to the saltwater supply tank 118. As the saltwater return pump 146 has a relatively low power requirement, it may be powered by a small PV panel that requires little or no maintenance to still provide enough power for the pump 146.

Figure 3:
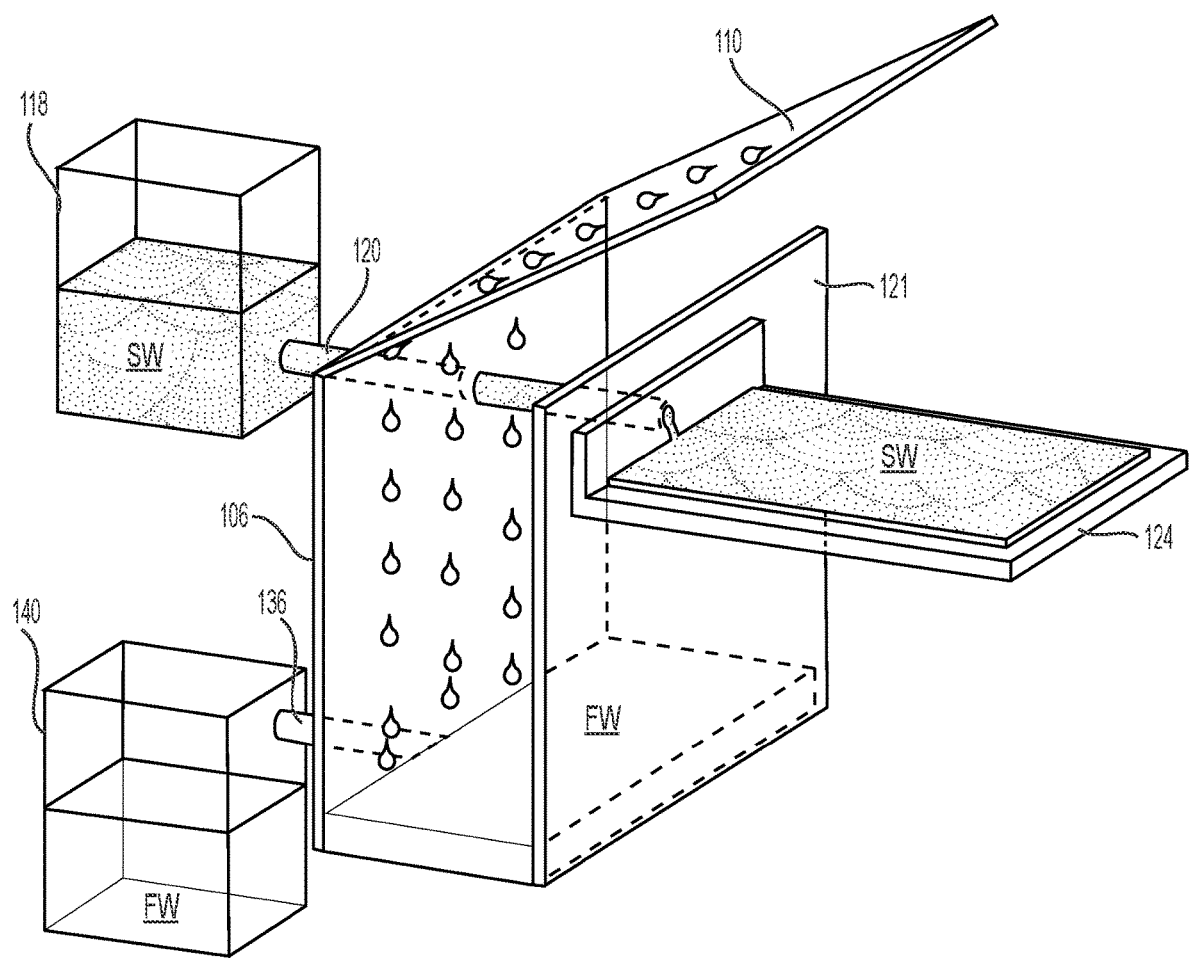
FIG. 3 is a schematic partial perspective view of a freshwater collection system of the direct solar desalination system with enhanced desalination of FIG. 1.

The details of the freshwater collection system of the direct solar desalination system 100 are shown in FIGS. 1 and 3. As the water evaporates from the saltwater SW on the plates 124, 126, on the channels/wires 128, 200, in the saltwater basin, (and any on the right wall 108), water vapor WV is formed and rises until it condenses as fresh water on the slanted, top cover 110. The condensed freshwater FW flows down the top cover 110 until it reaches the left wall 106. The freshwater FW then flows down the left wall 106 and collects into the freshwater basin formed by the left wall 106, the salt/fresh-water divider wall 121 and the front and rear walls 104. Freshwater FW in the freshwater basin is drained to a freshwater tank 140 (or other freshwater storage/supply system) via a freshwater drainpipe 136. A freshwater drain valve 138 in the freshwater drainpipe 136, can be used to control the flow of freshwater FW drained from the freshwater basin.

As shown in FIG. 1, the saltwater supply tank 118 is above the top plate 124, so that saltwater SW can be gravity fed to the top plate 124. Likewise, the excess saltwater basin 134 and the freshwater tank 140 are below the bottom wall 112 of the distillation chamber 102 to allow gravity flow into the tanks 134, 140. The different elevations of the tanks 118, 134, 140 and the bottom wall 112 of the distillation chamber 102 may be provided by natural features, such as hills, etc., or alternatively, stands 142 may be provided to maintain the correct elevations, as well as to keep the tanks off of the base of the installation.

It is to be understood that the direct solar desalination system with enhanced desalination is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A direct solar desalination system with enhanced desalination, comprising:
    a distillation chamber having:
        a slanted, transparent top cover;
        a bottom wall;

a front wall extending vertically between the bottom wall and the top cover;

a rear wall extending vertically between the bottom wall and the top cover;

a first sidewall extending vertically between the bottom wall and the top cover and extending horizontally from the front wall to the rear wall;

a second sidewall extending vertically between the bottom wall and the top cover and extending horizontally from the front wall to the rear wall, the second sidewall being shorter than the first sidewall;

a saltwater/freshwater divider wall extending vertically between the bottom wall and a point just below the top cover and extending horizontally from the front wall to the rear wall, the divider wall being parallel to the second sidewall and defining a path for recovery of freshwater condensed on the top cover; and at least one pair of distillation plates disposed inside the distillation chamber defining a path for flow of saltwater in the distillation chamber, each pair of distillation plates including:

a top plate slanting medially and downward from the divider plate into the distillation chamber;

a return plate below the top plate, the return plate having a greater length than the top plate and slanting downward from inside the distillation chamber back toward the divider wall.

2. The direct solar desalination system as recited in claim 1, wherein said at least one pair of distillation plates comprises a plurality of pairs of distillation plates of progressively increasing length extending between the top cover and bottom wall of said distillation chamber.

3. The direct solar desalination system as recited in claim 1, wherein:

the top plate of said at least one pair of distillation plates has a slope of −30°; and the return plate of said at least one pair of distillation plates has a slope of +30°.

4. The direct solar desalination system as recited in claim 1, wherein the top plate of each said at least one pair of distillation plates has an edge distal from said divider wall, the system further comprising a plurality of elongate members made from a material absorbing heat, the elongate members extending downward between the distal edge of the top plate and the second sidewall.

5. The direct solar desalination system according to claim 4, wherein each of said plurality of elongate members comprises a copper wire.

6. The direct solar desalination system according to claim 4, each of said plurality of elongate members comprises an elongate U-shaped channel made of copper.

7. The direct solar desalination system as recited in claim 4, wherein each of said elongate members is coated with a photothermal material to form a photothermal layer on said elongate member.

8. The direct solar desalination system as recited in claim 1, wherein the top cover includes reflectors extending above the top cover configured for reflecting sun rays toward the distillation chamber.

9. The direct solar desalination system as recited in claim 1, wherein the front wall, the rear wall, the first sidewall, and the second sidewall are each transparent to enhance heat from solar radiation within said distillation chamber.

10. The direct solar desalination system as recited in claim 1, further comprising:

a saltwater supply tank having a supply of saltwater stored therein;

a saltwater supply pipe extending from the saltwater supply tank through the left wall and the saltwater/freshwater divider wall of said desalination chamber to supply saltwater to the at least one pair of distillation plates;

an excess saltwater basin;

a saltwater drainpipe directing excess saltwater from the bottom of said distillation chamber into the excess saltwater basin;

a freshwater tank;

a freshwater drainpipe for draining freshwater from the path for recovery of freshwater into the freshwater tank.

11. The direct solar desalination system as recited in claim 10, wherein the saltwater supply tank is transparent.

12. The direct solar desalination system as recited in claim 10, further comprising:

a saltwater supply valve in the saltwater supply pipe;

an excess saltwater valve in the saltwater drainpipe; and a freshwater drain valve in the freshwater drainpipe.

13. The direct solar desalination system as recited in claim 10, wherein: the saltwater supply tank is above the top plate of said at least one pair of distillation plates; the excess saltwater basin is below the bottom wall of said distillation chamber: and the freshwater tank is below the bottom wall of said distillation chamber.

14. The direct solar desalination system as recited in claim 10, further comprising a plurality of stands supporting the saltwater supply tank, the excess saltwater basin, the distillation chamber, and the freshwater tank, respectively.

* * * * *